(12) United States Patent
Horiguchi (10) Patent No.: US 9,977,176 B2
(45) Date of Patent: May 22, 2018

(54) BACKLIGHT DEVICE AND DISPLAY APPARATUS

(71) Applicant: Sakai Display Products Corporation, Sakai-shi, Osaka (JP)

(72) Inventor: Yuki Horiguchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 384 days.

(21) Appl. No.: 14/764,796

(22) PCT Filed: Apr. 22, 2014

(86) PCT No.: PCT/JP2014/061248
§ 371 (c)(1),
(2) Date: Jul. 30, 2015

(87) PCT Pub. No.: WO2014/185227
PCT Pub. Date: Nov. 20, 2014

(65) Prior Publication Data
US 2016/0011364 A1    Jan. 14, 2016

(30) Foreign Application Priority Data
May 15, 2013    (JP) ................................ 2013-103433

(51) Int. Cl.
*G02B 6/00* (2006.01)
*F21V 8/00* (2006.01)
*G02F 1/1335* (2006.01)
*G02F 1/1333* (2006.01)

(52) U.S. Cl.
CPC ........... *G02B 6/0088* (2013.01); *G02B 6/005* (2013.01); *G02F 1/133606* (2013.01); *G02B 6/0085* (2013.01); *G02F 2001/133317* (2013.01); *G02F 2201/46* (2013.01)

(58) Field of Classification Search
CPC ..... G02B 6/0086; G02B 6/0088; G02B 6/005
USPC ............. 362/97.1, 618, 632–634; 385/90–92
See application file for complete search history.

(56) References Cited

U.S. PATENT DOCUMENTS

2002/0080298 A1 *  6/2002  Fukayama ........ G02F 1/133308
                                                          349/58
2009/0103328 A1     4/2009  Iwasaki

FOREIGN PATENT DOCUMENTS

| JP | 2005-276716 A | 10/2005 |
| JP | 2009-117349 A | 5/2009 |
| JP | 2013-242368 A | 12/2013 |

* cited by examiner

*Primary Examiner* — Sean Gramling
*Assistant Examiner* — Gerald J Sufleta, II
(74) *Attorney, Agent, or Firm* — Rudy J. Ng; Bret E. Field; Bozicevic, Field & Francis LLP (57) ABSTRACT

Provided are a compact and inexpensive backlight device that can prevent a large movement of an optical sheet, and a display apparatus including the backlight device. In a backlight device, light emitted by the plurality of LEDs enters an upper end face of a light guide plate, and the light guide plate emits the light from one plane. The optical sheet faces one plane of the light guide plate. A cover body is provided between one plane of the light guide plate and the optical sheet, and covers the plurality of LEDs and the circumferential part of one plane of the light guide plate on the LED side. A regulation member is engaged with each of the optical sheet and the cover body to regulate a movement of the optical sheet in the plane direction.

6 Claims, 12 Drawing Sheets

BACKLIGHT DEVICE AND DISPLAY APPARATUS

This application is the national phase under 35 U.S.C. § 371 of PCT International Application No. PCT/JP2014/061248 which has an International filing date of Apr. 22, 2014 and designated the United States of America.

FIELD

The present invention relates to a backlight device that irradiates a display panel for displaying an image with light, and a display apparatus including the backlight device.

BACKGROUND

As a backlight device that irradiates a display panel for displaying an image with light, there is a direct type backlight device in which light emitting diodes (LEDs), cold-cathode tubes, or the like are disposed at positions facing one plane of the display panel (for example, see Japanese Patent Application Laid-Open No. 2005-276716). In addition, as another backlight device, there is an edge light type backlight device that includes: a light guide plate; and a light source disposed at a position facing an end face of the light guide plate, the light guide plate irradiating a display panel from one plane the light guide plate with light entering the end face from the light source.

Currently, as a display apparatus including a display panel and a backlight device that irradiates the display panel with light, a thin type display apparatus whit a narrowed frame is required. As a conventional edge light type backlight device included in such a display apparatus, there is a backlight device that includes: a cover body that covering the light source and a circumferential part of one plane of the light guide plate on the light source side; and an optical sheet disposed on a side opposite to one side of the cover body on which the light guide plate is disposed. The cover body is provided to prevent from irradiating the display panel with light directly from the light source.

In such a conventional backlight device, light enters the end face of the light guide plate from the light source and the light guide plate irradiates the display panel from one plane of the light guide plate with the light through the optical sheet.

SUMMARY

However, in the conventional backlight device, the optical sheet is only disposed on one side of the cover body so that the optical sheet may be largely moved due to a vibration of the display apparatus including the conventional backlight device, or an impact applied to the display apparatus.

When the optical sheet is largely moved, the display panel may be scratched so that quality of an image displayed on the display panel is deteriorated.

The direct type backlight device described in Japanese Patent Application Laid-Open No. 2005-276716 discloses a configuration in which a cover member that covers a circumferential part of the optical sheet and a backlight chassis that supports the light source are fixed to each other by a screw. This configuration can prevent the large movement of the optical sheet so that it is conceivable to apply this configuration to the conventional edge light type backlight device.

However, the backlight device, in which the configuration described in Japanese Patent Application Laid-Open No. 2005-276716 is applied to the conventional backlight device, requires a screw for fixing the cover member to the backlight chassis, and further needs to provide a space for screwing the screw to the backlight chassis. Therefore, the backlight device to which the configuration described in Japanese Patent Application Laid-Open No. 2005-276716 is applied has a problem that the space provided at the circumference of the optical sheet is wide, and a manufacturing cost is expensive.

When the space provided at the circumference of the optical sheet is wide, the display apparatus including the backlight device to which the configuration described in Japanese Patent Application Laid-Open No. 2005-276716 is applied, has the wide frame that covers the circumferential part of the display panel.

The present invention has been made in view of the circumstances as described above. An object of the present invention is to provide a compact and inexpensive backlight device that can prevent a large movement of the optical sheet, and a display apparatus including the backlight device.

The backlight device according to the present invention includes: a light source; a light guide plate with an end face which light from the light source enters and with one plate from which the light emitted; an optical sheet that faces the one plane; and a cover body that is disposed between the one plane of the light guide plate and the optical sheet, and covers the light source and a circumferential part of the one plane on the light source side. The backlight device further includes a regulation member that is engaged with each of the optical sheet and the cover body to regulate a movement of the optical sheet in a plane direction.

According to the present invention, light enters the end face of the light guide plate from the light source, and then the light guide plate emits the light from one plane of the light guide plate through the optical sheet facing one plane. The cover body is disposed between one plane of the light guide plate and the optical sheet. The cover body covers the light source and the circumferential part of one plane of the light guide plate on the light source side. The regulation member is engaged with each of the optical sheet and the cover body to regulate the movement of the optical sheet in the plane direction.

The movement of the optical sheet in the plane direction is regulated by the cover body and the regulation member. Therefore, a large movement of the optical sheet is prevented. Further, the regulation member regulates the movement of the optical sheet in the plane direction by the engagement with each of the optical sheet and the cover body so that a screw is not required and the manufacturing cost is inexpensive. Furthermore, there is no need to provide a space for screwing the screw so that the backlight device is compact.

In the backlight device according to the present invention, the optical sheet includes a through hole. The cover body includes: a first cover part that covers the circumferential part; a second cover part that covers the end face; a first hole that is provided in the first cover part and communicates with the through hole; and a second hole provided in the second cover part. The regulation member includes a first insertion part that is inserted into the through hole and the first hole; a second insertion part that is inserted into the second hole; and a connecting part that connects the first insertion part with the second insertion part.

According to the present invention, the optical sheet is provided with the through hole. In the cover body, the first cover part that covers the circumferential part of one plane of the light guide plate on the light source side is provided with the first hole that communicates with the through hole of the optical sheet. The second cover part that covers the end face of the light guide plate which the light from the light source enters is provided with the second hole. In the regulation member, the first insertion part and the second insertion part are connected with each other by the connecting part. The first insertion part is inserted into the through hole of the optical sheet and the first hole, and the second insertion part is inserted into the second hole, so that the regulation member is engaged with each of the optical sheet and the cover body, and regulates the movement of the optical sheet in the plane direction.

In the backlight device according to the present invention, the optical sheet includes a through hole. The cover body includes: a first cover part that covers the circumferential part; a second cover part that covers the end face; a protrusion part that protrudes from the first cover part and is inserted into the through hole; and a hole provided in the second cover part. The regulation member includes: an annular part that is engaged with the protrusion part inserted into the through hole; an insertion part that is inserted into the hole; and a connecting part that connects the annular part with the insertion part.

According to the present invention, the optical sheet is provided with the through hole. In the cover body, the first cover part that covers the circumferential part of one plane of the light guide plate on the light source side is provided with the protrusion part that is inserted into the through hole of the optical sheet. The second cover part that covers the end face of the light guide plate that the light from the light source enters is provided with the hole. In the regulation member, the annular part and the insertion part are connected with each other by the connecting part. The annular part is engaged with the protrusion part that has been inserted into the through hole of the optical sheet, and the insertion part is inserted into the hole, so that the regulation member is engaged with each of the optical sheet and the cover body, and regulates the movement of the optical sheet in the plane direction.

The display apparatus according to the present invention includes: a display panel that displays an image; and the above-described backlight device that irradiates the display panel with light.

According to the present invention, the above-described backlight device irradiates the display panel with light and the display panel displays an image. Thereby, the large movement of the optical sheet included in the above-described backlight device is prevented. The display apparatus includes the above-described backlight device so as to be compact and inexpensive.

According to the present invention, the regulation member is engaged with each of the optical sheet and the cover body to regulate the movement of the optical sheet in the plane direction, so that the large movement of the optical sheet can be prevented, and a compact and inexpensive configuration can be achieved.

The above and further objects and features will move fully be apparent from the following detailed description with accompanying drawings.

DETAILED DESCRIPTION OF NON-LIMITING EXAMPLE EMBODIMENTS

Hereinafter, the present invention will be described in detail with reference to the accompanying drawings illustrating embodiments thereof.

Embodiment 1

Figure 1:
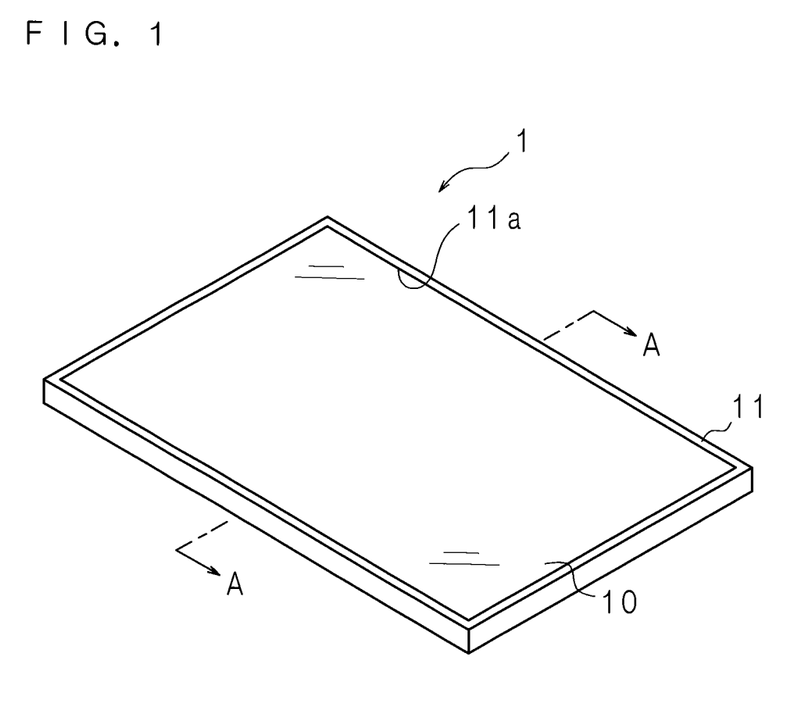
FIG. 1 is a view illustrating an appearance of a display apparatus according to Embodiment 1.

FIG. 1 is a view illustrating an appearance of a display apparatus according to Embodiment 1. The display apparatus 1 includes a rectangular plate-shaped display panel 10 having a display surface for displaying an image on a front side. A front circumferential part of the display panel 10 is covered by a rectangular frame-shaped frame 11 having an opening 11a at a central part thereof. In the display panel 10, an effective display region located at the central part of the display surface is exposed from the opening 11a.

Herein, vertical and horizontal dimensions of the opening 11a are slightly smaller than the vertical and horizontal dimensions of the display panel 10 so that the frame 11 covers the circumference of the display panel 10.

Figure 2:
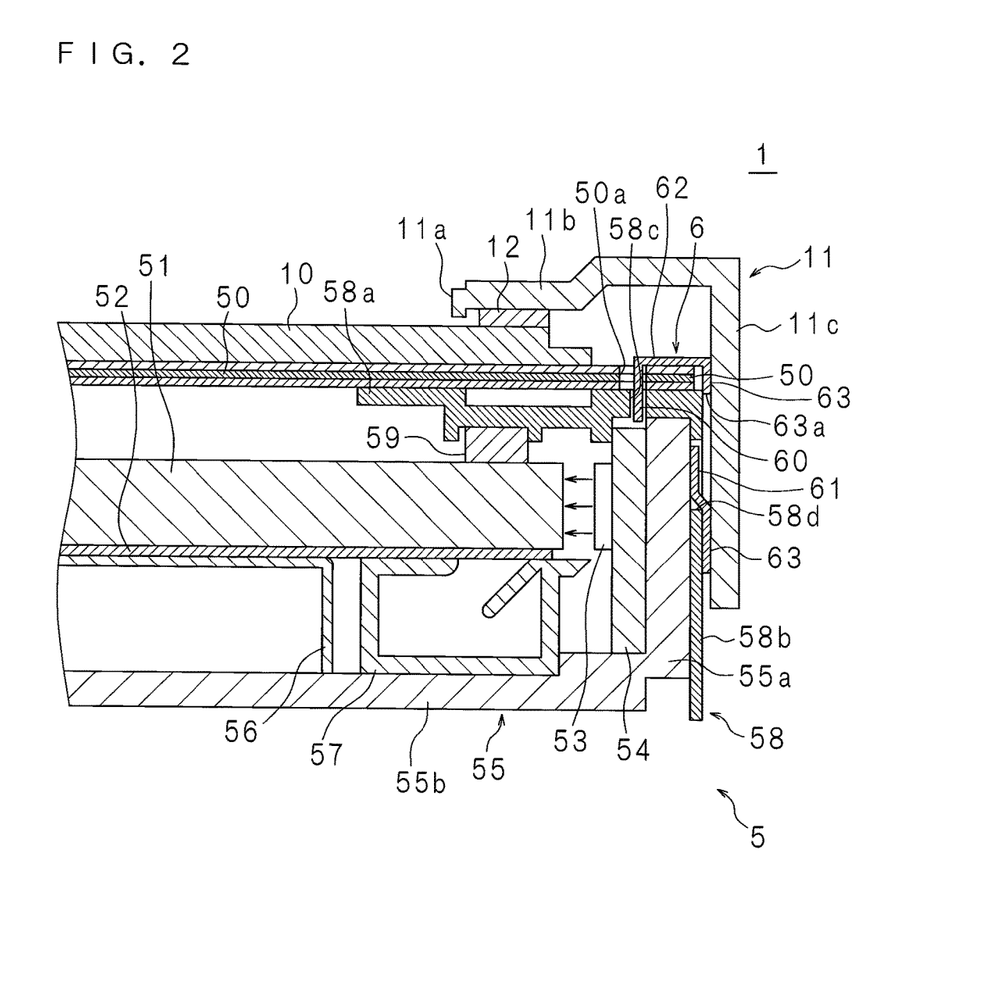
FIG. 2 is a partial cross-sectional view taken along line A-A in FIG. 1.

FIG. 2 is a partial cross-sectional view taken along line A-A in FIG. 1. The frame 11 has a cross-section formed in an L shape. The frame 11 further has: a front wall part 11b which covers the front circumferential part of the display panel 10; and a circumferential wall part 11c which is connected to the front wall part 11b and covers an end face of the display panel 10. A buffer material 12 is disposed between the front wall part 11b of the frame 11 and the circumferential part of the display panel 10.

The display apparatus 1 further includes a backlight device 5 on a rear side of the display panel 10. The backlight device 5 irradiates the display panel 10 with light from the rear side toward the front side. The backlight device 5 irradiates the display panel 10 with light from the rear side so that the display panel 10 displays an image on the display surface. The display panel 10 is, for example, a liquid crystal panel.

The backlight device 5 includes a rectangular optical sheet 50, a rectangular plate-shaped light guide plate 51, a rectangular reflection sheet 52, and a plurality of LEDs 53. The optical sheet 50 is formed by laminating a plurality of sheets, which perform various optical functions, such as a view expansion sheet, an anti-reflection sheet, or the like.

The optical sheet 50 is disposed while one surface of the optical sheet 50 is in close contact with a rear surface of the display panel 10.

The light guide plate 51 is disposed on the rear side of the optical sheet 50. A front surface of the light guide plate 51 which forms one plane faces the optical sheet 50. A rear surface of the light guide plate 51 is in close contact with the reflection sheet 52. The plurality of LEDs 53 are juxtaposed at positions facing an upper end face (right side of FIG. 2) of the light guide plate 51 in a left-right direction (a direction perpendicular to the paper surface of FIG. 2), specifically, in a longitudinal direction of the upper end face of the light guide plate 51.

Each of the plurality of LEDs 53 functions as a light source, and emit light in a direction indicated by arrows. The light emitted by each of the plurality of LEDs 53 enters the upper end face of the light guide plate 51. The light guide plate 51 is made of, for example, an acrylic resin. The light that has entered the upper end face of the light guide plate 51 is repeatedly reflected by the front and rear surfaces. When the light propagating through the light guide plate 51 is reflected on the front surface of the light guide plate 51, a part of the light emits toward the optical sheet 50. The rear surface of the light guide plate 51 is in close contact with the reflection sheet 52 so that all the light propagating through the light guide plate 51 is reflected on the rear surface. Therefore, the light guide plate 51 uniformly emits light from the front side which forms one plane toward the optical sheet 50.

A rectangular plate-shaped LED substrate 54 is disposed on an upper side of the plurality of LEDs 53. A lower surface of the LED substrate 54 faces the upper end face of the light guide plate 51. The plurality of LEDs 53 are mounted on the lower surface of the LED substrate 54. An upper surface of the LED substrate 54 is in close contact with a heat dissipater 55. Heat generated from the LED substrate 54 by emittance of the plurality of LEDs 53 is transmitted to the heat dissipater 55.

The heat dissipater 55 has a cross-section formed in an L shape. The heat dissipater 55 further has: an upper wall part 55a which covers the upper end face of the light guide plate 51 and is in close contact with the LED substrate 54; and a rear wall part 55b which is connected to the upper wall part 55a and is disposed on the rear side of the light guide plate 51. The rear wall part 55b of the heat dissipater 55 is exposed to ambient air. Heat generated from the LED substrate 54 is transmitted to the rear wall part 55b through the upper wall part 55a and is discharged from the rear wall part 55b into the ambient air.

A backlight chassis 56 is disposed between the rear wall part 55b of the heat dissipater 55 and the reflection sheet 52. The backlight chassis 56 supports the light guide plate 51 and the reflection sheet 52. In addition, a spacer 57 is disposed between the rear wall part 55b and the circumferential part of the rear surfaces of the light guide plate 51 and the reflection sheet 52 on the upper side, that is, the LED 53 side.

The backlight device 5 further includes a cover body 58 that covers the plurality of LEDs 53 and the upper side of the circumferential part of the front surface of the light guide plate 51. The cover body 58 is disposed between the front surface of the light guide plate 51 and the optical sheet 50. The cover body 58 has a cross-section formed in an L shape. The cover body 58 has: a first cover part 58a that covers the upper circumferential part of the front surface of the light guide plate 51; and a second cover part 58b that is connected to the first cover part 58a and covers the upper end face of the light guide plate 51 from the upper side of the upper wall part 55a of the heat dissipater 55.

A buffer material 59 is disposed between the first cover part 58a of the cover body 58 and the front surface of the light guide plate 51.

A portion of an upper side of the optical sheet 50 extends upward from the display panel 10. The optical sheet 50 has a through hole 50a that penetrates through the optical sheet 50 in a front-rear direction at an extending portion of the optical sheet 50 on the upper side. The first cover part 58a of the cover body 58 is provided with a first hole 58c that penetrates through the first cover part 58a in the front-rear direction and communicates with the through hole 50a. The second cover part 58b is provided with a second hole 58d that penetrates through the second cover part 58b in an upper-lower direction.

The backlight device 5 further includes a regulation member 6 that is engaged with each of the optical sheet 50 and the cover body 58 to regulate the movement of the optical sheet 50 in the plane direction. The regulation member 6 is provided with a first insertion part 60 that is inserted into the through hole 50a formed in the optical sheet 50 and the first hole 58c formed in the first cover part 58a of the cover body 58. In addition, the regulation member 6 is provided with a second insertion part 61 that is inserted into the second hole 58d formed in the second cover part 58b of the cover body 58.

The regulation member 6 further has: a front wall part 62 that is connected to the first insertion part 60 and is disposed on the front side of the optical sheet 50, and an upper wall part 63 that is connected to the second insertion part 61 and the front wall part 62 and is disposed on the upper side of the second cover part 58b of the cover body 58. The front wall part 62 and the upper wall part 63 connects the first insertion part 60 and the second insertion part 61 so as to function as a connecting part.

As described above, the first insertion part 60 is inserted into the through hole 50a and the first hole 58c, and the second insertion part 61 that is connected to the first insertion part 60 by the front wall part 62 and the upper wall part 63 is inserted into the second hole 58d. Therefore, the regulation member 6 is engaged with each of the optical sheet 50 and the cover body 58. It is noted that a portion that covers the upper end face of the display panel 10 in a circumferential wall part 11c of the frame 11 is located on the upper side of the upper wall part 63 of the regulation member 6.

Figure 3:
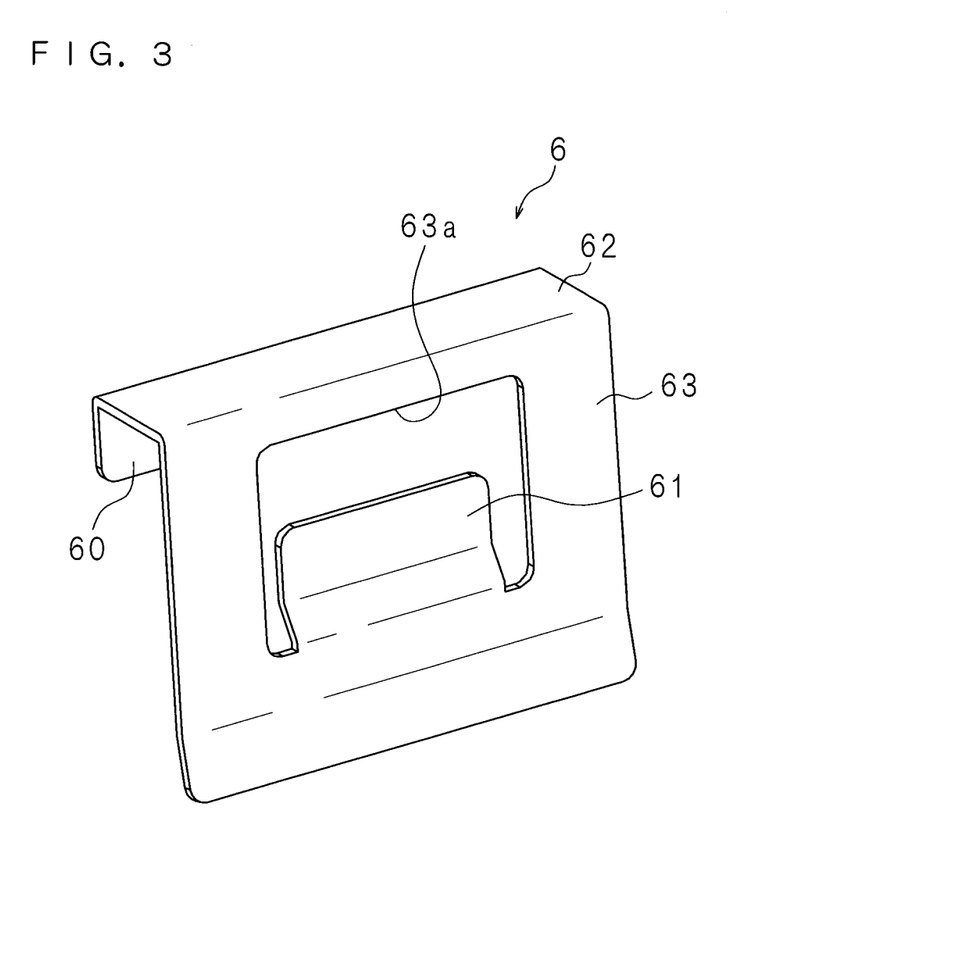
FIG. 3 is a perspective view of a regulation member as viewed from one side.
Figure 4:
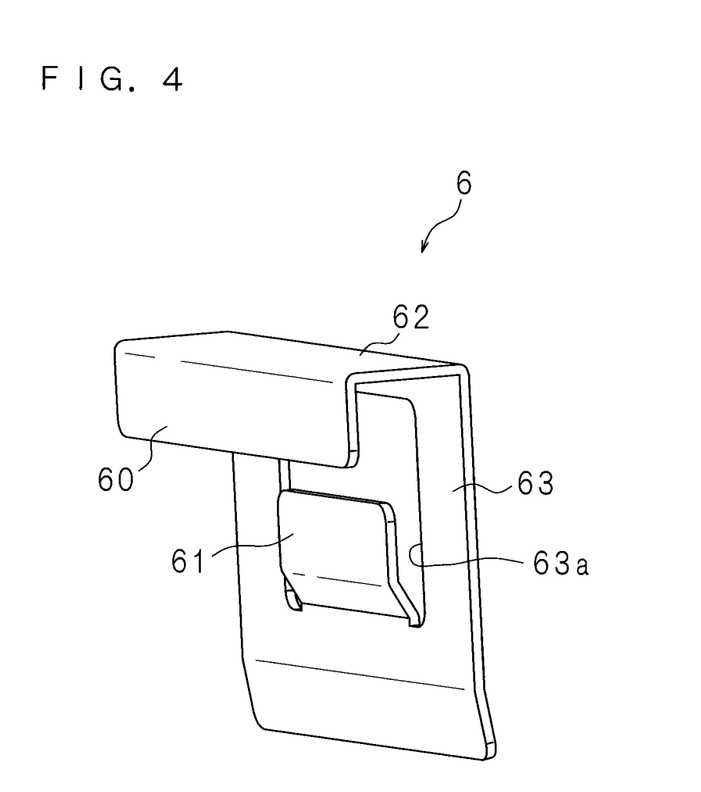
FIG. 4 is a perspective view of the regulation member as viewed from the other side.

FIG. 3 is a perspective view of the regulation member 6 as viewed from one side, and FIG. 4 is a perspective view of the regulation member 6 as viewed from the other side. Each of the first insertion part 60 and the front wall part 62 of the regulation member 6 is formed in a rectangular plate shape, as illustrated in FIG. 3. The front wall part 62 protrudes from one long side of the first insertion part 60 in a direction perpendicular to the first insertion part 60. One long side of the front wall part 62 is connected to one long side of the first insertion part 60. The upper wall part 63 is formed in a rectangular plate shape, and has a rectangular opening 63a at the central part. The front wall part 62 protrudes from an outer one side of the upper wall part 63 in a direction perpendicular to the upper wall part 63. The outer one side of the upper wall part 63 is connected with the other long side of the front wall part 62. The upper wall part 63 faces the first insertion part 60.

Then, an inner one side of the upper wall part 63 which forms the opening 63a is connected with one side of the second insertion part 61 formed in a rectangular plate shape.

The second insertion part 61 is disposed in such a manner that a plate surface of the second insertion part 61 is located on the lower side, that is, the first insertion part 60 side from the plate surface of the upper wall part 63. It is noted that the regulation member 6 can be made of any resin or sheet metal as long as it has elasticity.

Figure 5:
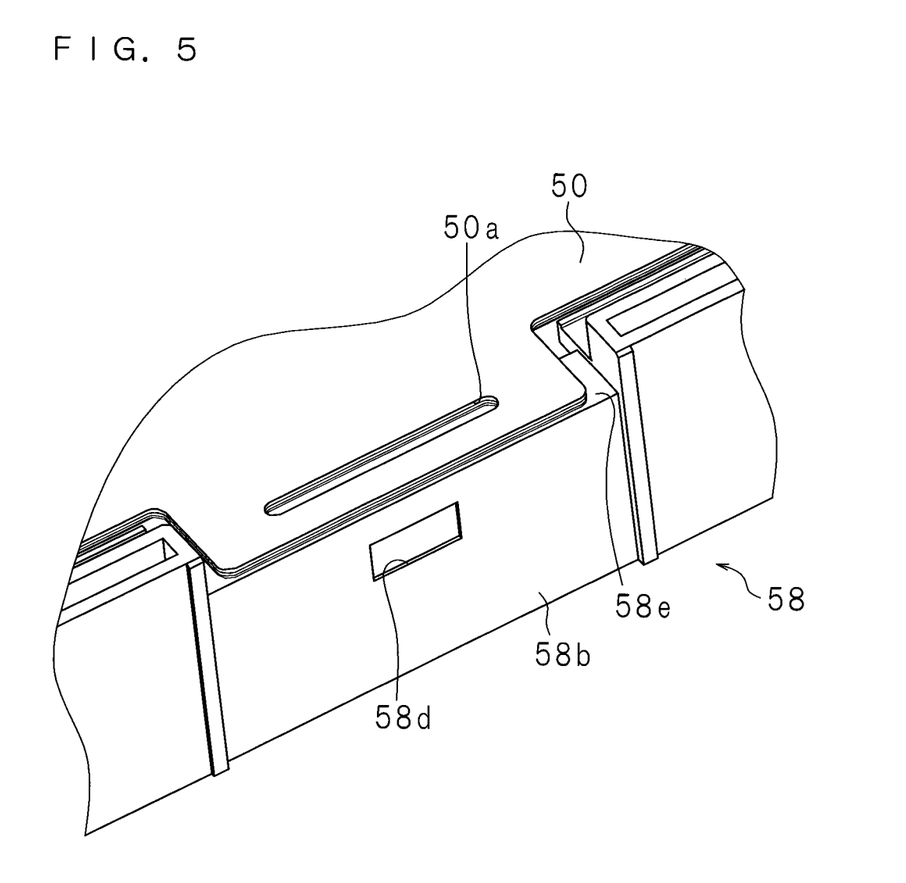
FIG. 5 is a perspective view of a backlight device from which the regulation member is removed.

FIG. 5 is a perspective view of the backlight device 5 from which the regulation member 6 is removed. As described above, the optical sheet 50 is disposed on the front side of the first cover part 58a of the cover body 58. The second cover part 58b of the cover body 58, as illustrated in FIG. 5, includes a portion which extends forward from the first cover part 58a, and a portion which does not extend forward from the first cover part 58a. The second cover part 58b is provided with a concave part 58e on the front side.

Further, as described above, a portion of the upper side of the optical sheet 50 extends upward, and as illustrated in FIG. 5, the extending portion of the optical sheet 50 is disposed on the concave part 58e of the cover body 58. The extending portion of the optical sheet 50 is provided with the rectangular through hole 50a. The longitudinal direction of the through hole 50a is substantially same as the longitudinal direction of the optical sheet 50, that is, the left-right direction.

The second cover part 58b of the cover body 58 is formed in a rectangular plate shape having the longitudinal direction which is substantially same as the left-right direction, as illustrated in FIG. 5. The second cover part 58b is provided with the rectangular second hole 58d. In the second cover part 58b, the second hole 58d is provided at a position which corresponds to the central part of the concave part 58e in the left-right direction. When the optical sheet 50 is disposed on the front side of the cover body 58, the second hole 58d corresponds to the central part of the through hole 50a of the optical sheet 50 in the left-right direction. It is noted that the above-described line A-A is a upper-lower line passing through the central part of the through hole 50a and the second hole 58d in the left-right direction.

Figure 6:
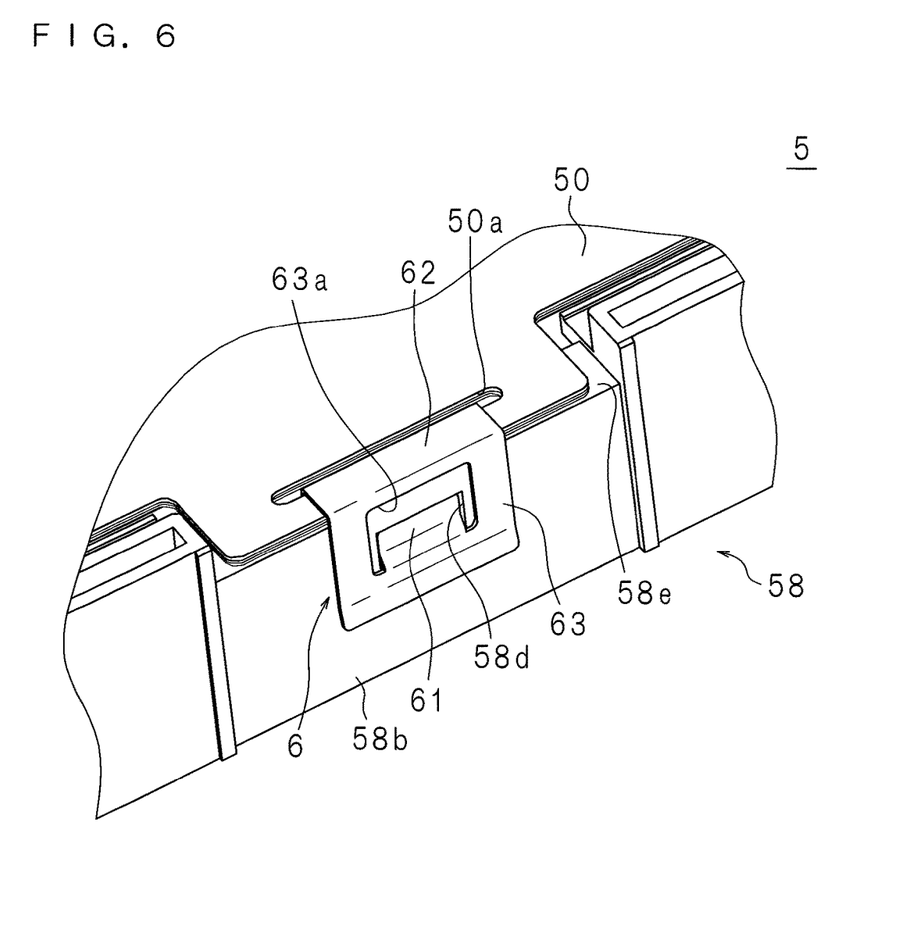
FIG. 6 is a perspective view of the backlight device to which the regulation member is attached.
Figure 7:
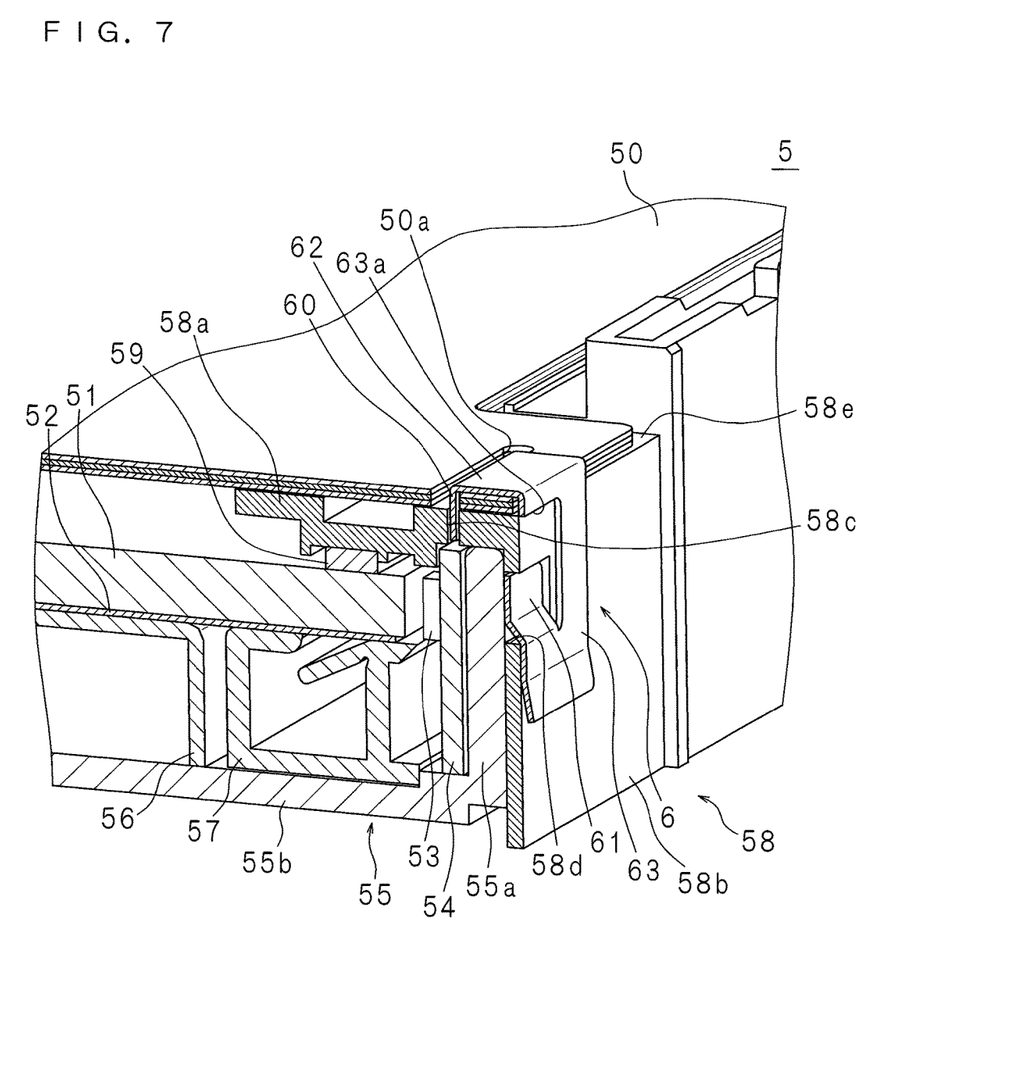
FIG. 7 is a cross-sectional perspective view illustrating a part of the backlight device.

FIG. 6 is a perspective view of the backlight device 5 to which the regulation member 6 is attached, and FIG. 7 is a cross-sectional perspective view illustrating a part of the backlight device 5. As illustrated in FIGS. 6 and 7, the first insertion part 60 is inserted into the through hole 50a of the optical sheet 50 and the first hole 58c provided in the first cover part 58a of the cover body 58, and the second insertion part 61 is inserted into the second hole 58d provided in the second cover part 58b of the cover body 58. Therefore, the regulation member 6 is engaged with each of the optical sheet 50 and the cover body 58. In this case, the lower surface of the second insertion part 61 faces the upper wall part 55a of the heat dissipater 55.

The second insertion part 61 of the regulation member 6 is inserted into the second hole 58d provided in the second cover part 58b of the cover body 58. Therefore, the regulation member 6 is prevented from moving in the front-rear and left-right directions, that is, in the plane direction of the second cover part 58b with respect to the cover body 58.

In the regulation member 6, a distance between the first insertion part 60 and the upper wall part 63 is slightly longer than the distance from the upper end of the optical sheet 50 to the upper side of the through hole 50a. Further, the distance of the front wall part 62 of the regulation member 6 in the left-right direction is slightly shorter than the distance of the through hole 50a of the optical sheet 50 in the left-right direction. Thereby, it is possible to allow the optical sheet 50 to be thermally expanded.

Further, the regulation member 6 is engaged with each of the optical sheet 50 and the cover body 58 so that the optical sheet 50 is not largely moved in the upper-lower and left-right directions with respect to the cover body 58. A portion of the optical sheet 50 between the upper end of the optical sheet 50 and the upper side of the through hole 50a is held by the front wall part 62 of the regulation member 6 and the first cover part 58a of the cover body 58. Therefore, the movement of the optical sheet 50 in the upper-lower and left-right directions is suppressed, and the movement of the optical sheet 50 in the plane direction is regulated. In addition, a upper-lower direction movement of the optical sheet 50 of a difference or more between the distance between the first insertion part 60 and the upper wall part 63 and the distance from the upper end of the optical sheet 50 to the upper side of the through hole 50a does not occur. The left-right direction movement of the optical sheet 50 of a difference or more between the distance of the front wall part 62 in the left-right direction and the distance of the through hole 50a in the left-right direction does not occur.

When the optical sheet 50 moves downward, the upper side of the through hole 50a of the optical sheet 50 contacts the first insertion part 60 of the regulation member 6, and then the optical sheet 50 is not further moved downward. In addition, when the optical sheet 50 moves upward, the upper end of the optical sheet 50 contacts the upper wall part 63 of the regulation member 6, and then the optical sheet 50 is not further moved upward.

When the optical sheet 50 moves in the left-right direction, the left or right side of the through hole 50a of the optical sheet 50 contacts the first insertion part 60 of the regulation member 6, and then the optical sheet 50 is not further moved leftward or rightward.

As described above, the regulation member 6 regulates the movement of the optical sheet 50 in the plane direction. Therefore, it is possible to prevent the optical sheet 50 from largely moving due to the vibration of the display apparatus 1, impact applied to the display apparatus 1 or the like. Accordingly, the large movement of the optical sheet 50 does not occur. Therefore, the display panel 10 is not scratched and a deterioration in a quality of the image displayed on the display panel 10 is prevented. Further, the regulation member 6 is engaged with each of the optical sheet 50 and the cover body 58 so that it is possible to regulate the movement of the optical sheet 50 in the plane direction without using a screw, and the backlight device 5 is inexpensive. Moreover, there is no need to provide a space for screwing the screw so that the backlight device 5 is compact. In addition, the display apparatus 1 including the compact and inexpensive backlight device 5 is also compact and inexpensive.

It is noted that each of the first insertion part 60 and the second insertion part 61 is not limited to the rectangular plate shape. The shape of the first insertion part 60 may be any shape as long as it can be inserted into the through hole 50a of the optical sheet 50 and the first hole 58c provided in the first cover part 58a of the cover body 58. The shape of the second insertion part 61 may be any shape as long as it can be inserted into the second hole 58d provided in the second cover part 58b of the cover body 58. In addition, the shape of each of the through hole 50a, the first hole 58c and the second hole 58d is not limited to the rectangular shape. The shape of each of the through holes 50a and the first hole 58c may be any shape as long as the first insertion part 60 can be inserted thereinto. The shape of the second hole 58d may be any shape as long as the second insertion part 61 can be inserted thereinto.

Further, in the regulation member 6, the upper wall part 63 of the regulation member 6 which functions as a part of the connecting part may not be a shape having the opening 63a as long as the first insertion part 60 is connected with the second insertion part 61.

Embodiment 2

Figure 8:
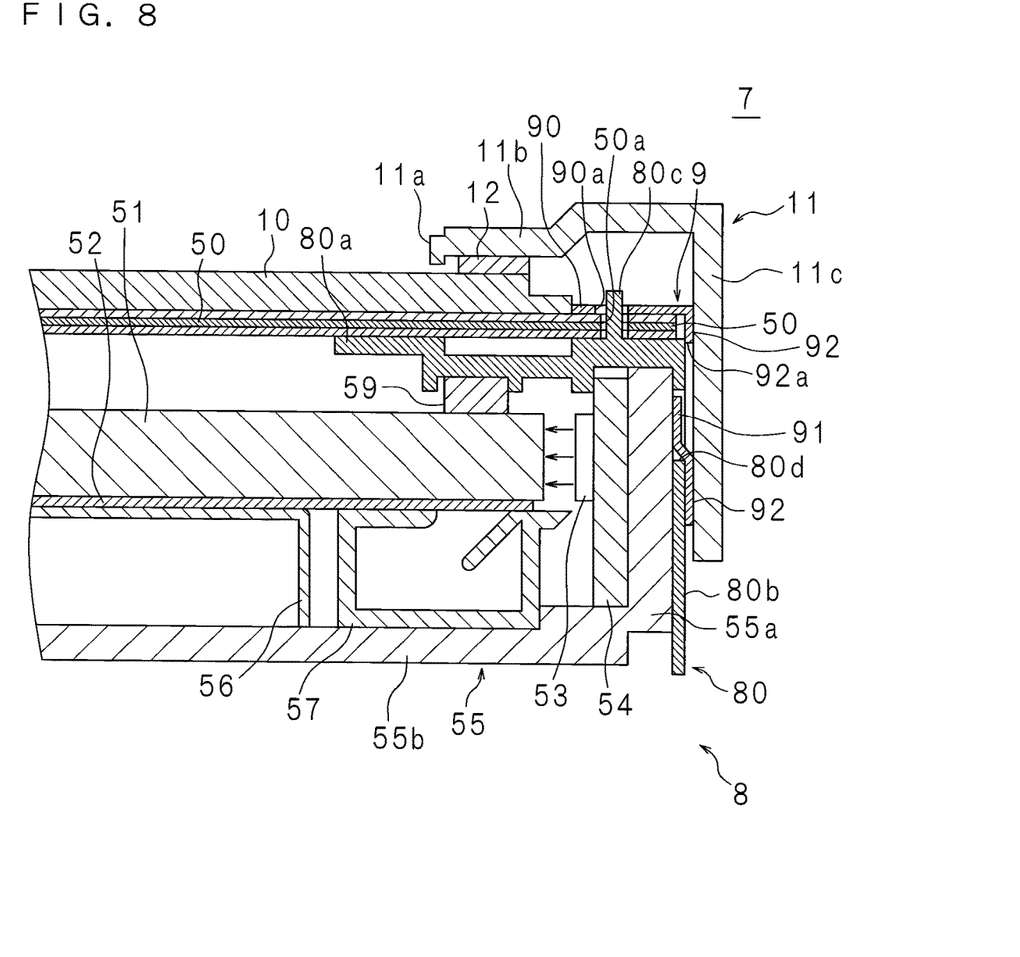
FIG. 8 is a partial cross-sectional view of a display apparatus according to Embodiment 2.

FIG. 8 is a partial cross-sectional view of a display apparatus according to Embodiment 2. The display apparatus 7, similar to the display apparatus 1 according to Embodiment 1, includes the display panel 10, the frame 11 and the buffer material 12. The display apparatus 7 includes a backlight device 8 instead of the backlight device 5 according to Embodiment 1. The backlight device 8 is disposed on the rear side of the display panel 10. The backlight device 8, similar to the backlight device 5, irradiates the display panel 10 with light from the rear side toward the front side. The backlight device 8 irradiates the display panel 10 with light from the rear side of the display panel 10 so that the display panel 10 displays an image on the display surface.

The backlight device 8, similar to the backlight device 5 of Embodiment 1, includes the optical sheet 50, the light guide plate 51, the reflection sheet 52, the plurality of LEDs 53, the LED substrate 54, the heat dissipater 55, the backlight chassis 56, the spacer 57 and the buffer material 59. The backlight device 8 includes a cover body 80 instead of the cover body 58, and a regulation member 9 instead of the regulation member 6.

The backlight device 8 is different from the backlight device 5 according to Embodiment 1 in terms of the configuration for regulating the optical sheet 50. Hereinafter, the configuration for regulating the optical sheet 50 will be described. The components of Embodiment 2 having configurations common to Embodiment 1 are denoted by the same reference codes and will not be described in detail.

The optical sheet 50, the light guide plate 51 and the plurality of LEDs 53 are disposed in the same manner as Embodiment 1. Therefore, the optical sheet 50 faces the front surface of the light guide plate 51, and light emitted by the plurality of LEDs 53 enters the upper end face of the light guide plate 51. The light guide plate 51 uniformly emits the light from the front surface of the light guide plate 51 toward the optical sheet 50. The optical sheet 50, similar to Embodiment 1, has a through hole 50a.

The cover body 80, similar to the cover body 58 according to Embodiment 1, is disposed between the front surface of the light guide plate 51 and the optical sheet 50. The cover body 80 covers the plurality of LEDs 53 and the upper circumferential part of the front surface of the light guide plate 51. The cover body 80 has a cross-section formed in an L shape. The cover body 80 has: a first cover part 80a that covers the upper circumferential part of the front surface of the light guide plate 51; and a second cover part 80b that is connected to the first cover part 80a and covers the upper end face of the light guide plate 51 from the upper side of the upper wall part 55a of the heat dissipater 55. The buffer material 59 is disposed between the first cover part 80a of the cover body 80 and the front surface of the light guide plate 51.

The first cover part 80a of the cover body 80 is provided with a protrusion part 80c. The protrusion part 80c protrudes forward from the front surface of the first cover part 80a. In the backlight device 8, the protrusion part 80c is inserted into the through hole 50a of the optical sheet 50. In addition, the second cover part 80b is provided with a hole 80d that penetrates through the second cover part 80b in the upper-lower direction.

The regulation member 9 is engaged with each of the optical sheet 50 and the cover body 80 to regulate the movement of the optical sheet 50 in the plane direction. The regulation member 9 is provided with an annular part 90 which is disposed on the front side of the optical sheet 50. The annular part 90 is engaged with the protrusion part 80c of the cover body 80 which is inserted into the through hole 50a of the optical sheet 50. The regulation member 9 further has: an insertion part 91 that is inserted into the hole 80d provided in the second cover part 80b of the cover body 80; and a connecting part 92 that is disposed on the upper side of the upper wall part 55a of the heat dissipater 55 and connects the annular part 90 with the insertion part 91.

As described above, the annular part 90 is engaged with the protrusion part 80c of the cover body 80 that has been inserted into the through hole 50a of the optical sheet 50, and the insertion part 91 is inserted into the hole 80d provided in second cover part 80b of the cover body 80. Therefore, the regulation member 9 is engaged with each of the optical sheet 50 and the cover body 80. It is noted that, in the circumferential wall part 11c of the frame 11, a portion that covers the upper end face of the display panel 10 is located on the upper side of the connecting part 92 of the regulation member 9.

Figure 9:
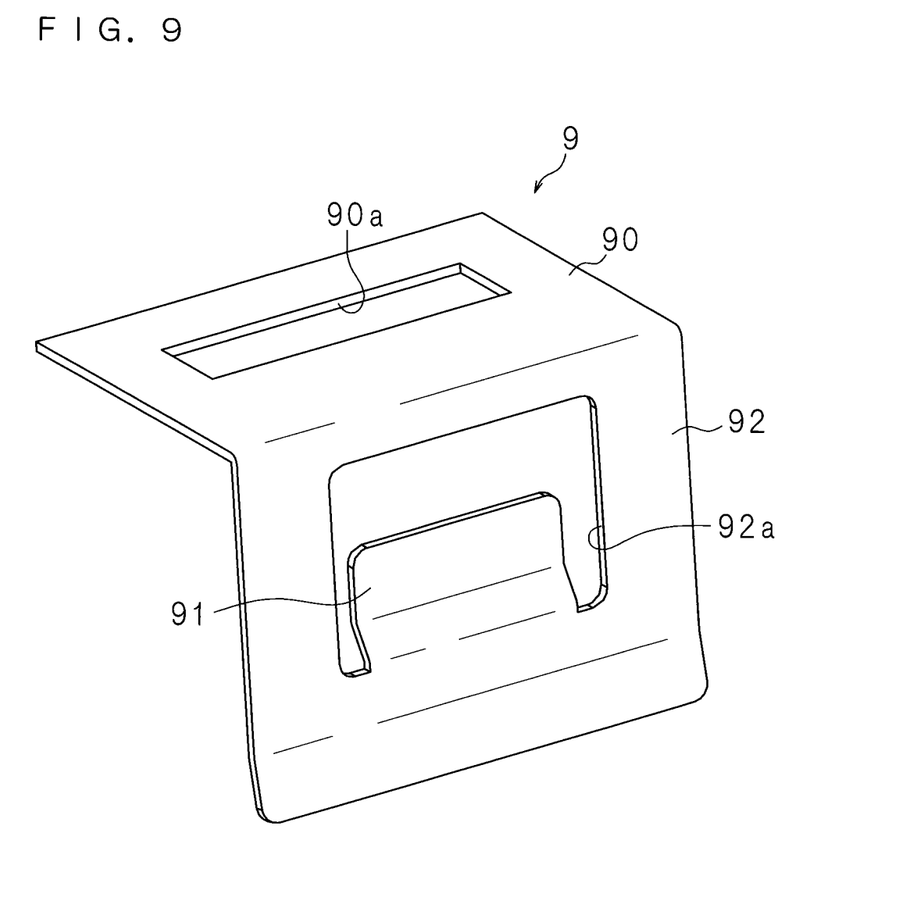
FIG. 9 is a perspective view of the regulation member.

FIG. 9 is a perspective view of the regulation member 9. The annular part 90 of the regulation member 9 is formed in a rectangular plate shape and has a rectangular opening 90a at the central part, as illustrated in FIG. 9. One side forming the opening 90a is substantially parallel to one side which forms an appearance of the annular part 90. The connecting part 92 is formed in a rectangular plate shape, protrudes in a direction perpendicular to the plate surface of the annular part 90 from an outer one side of the annular part 90, and is provided with a rectangular opening 92a at the central part.

An inner one side forming the opening 92a of the connecting part 92 is connected with one side of the insertion part 91 formed in a rectangular plate shape. The plate surface of the insertion part 91 is located on the lower side from the plate surface of the connecting part 92. Specifically, the plate surface of the insertion part 91 is located in a direction that the annular part 90 protrudes in the connecting part 92 from the plate surface of the connecting part 92. It is noted that the regulation member 9, similar to the regulation member 6, may be made of any resin or sheet metal as long as it has elasticity.

Figure 10:
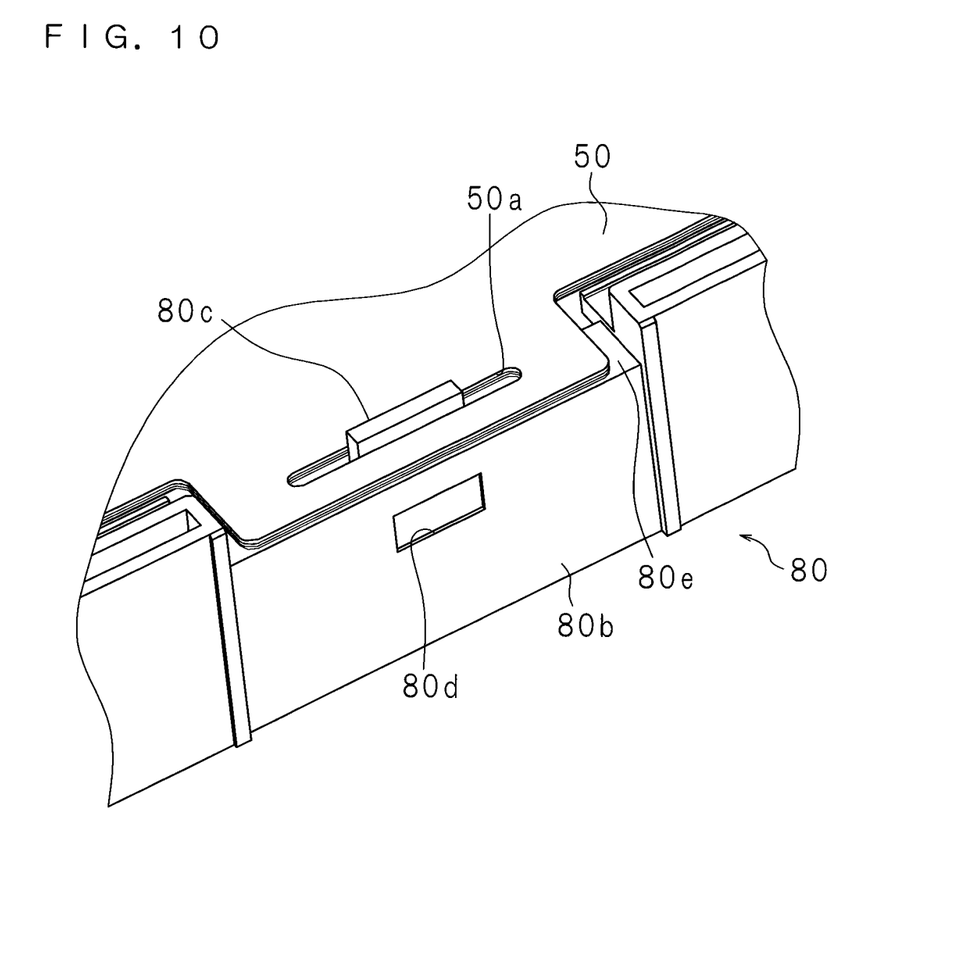
FIG. 10 is a perspective view of the backlight device from which the regulation member is removed.

FIG. 10 is a perspective view of the backlight device 8 from which the regulation member 9 is removed. The optical sheet 50 is disposed on the front side of the first cover part 80a of the cover body 80. The second cover part 80b of the cover body 80, as illustrated in FIG. 10, includes a portion which extends forward from the first cover part 80a, and a portion which does not extend forward from the first cover part 80a. The second cover part 80b is provided with a concave part 80e on the front side.

Further, a portion of the upper side of the optical sheet 50 extends in the same manner as Embodiment 1, and the extending portion of the optical sheet 50 is disposed on the concave part 80e of the cover body 80. The extending portion of the optical sheet 50 is provided with the rectangular through hole 50a. The longitudinal direction of the through hole 50a is substantially same as the longitudinal direction of the optical sheet 50, that is, the left-right direction. The protrusion part 80c of the cover body 80 is formed in a rectangular plate shape, and the plate surface of the protrusion part 80c is substantially perpendicular to the optical sheet 50. A direction perpendicular to the plate surface of the protrusion part 80c is substantially same as the upper-lower direction. The protrusion part 80c is inserted into the central part of the left-right direction in the through hole 50a of the optical sheet 50, and protrudes to the front side of the optical sheet 50.

The second cover part 80b of the cover body 80 is formed in a rectangular plate shape having the longitudinal direction which is substantially same as the left-right direction, as illustrated in FIG. 10. The second cover part 80b is provided with a rectangular hole 80d. In the second cover part 80b, the hole 80d is provided at a position which corresponds to the central part of the concave part 80e in the left-right direction. When the optical sheet 50 is disposed on the front side of the cover body 80, the hole 80d corresponds to the central part of the through hole 50a of the optical sheet 50 in the left-right direction and to the central part of the protrusion part 80c in the left-right direction. It is noted that, FIG. 8 illustrates a partial cross-sectional view taken along a line in the upper-lower direction passing through the central part of the left-right direction in the through holes 50a, the protrusion part 80c and the hole 80d.

Figure 11:
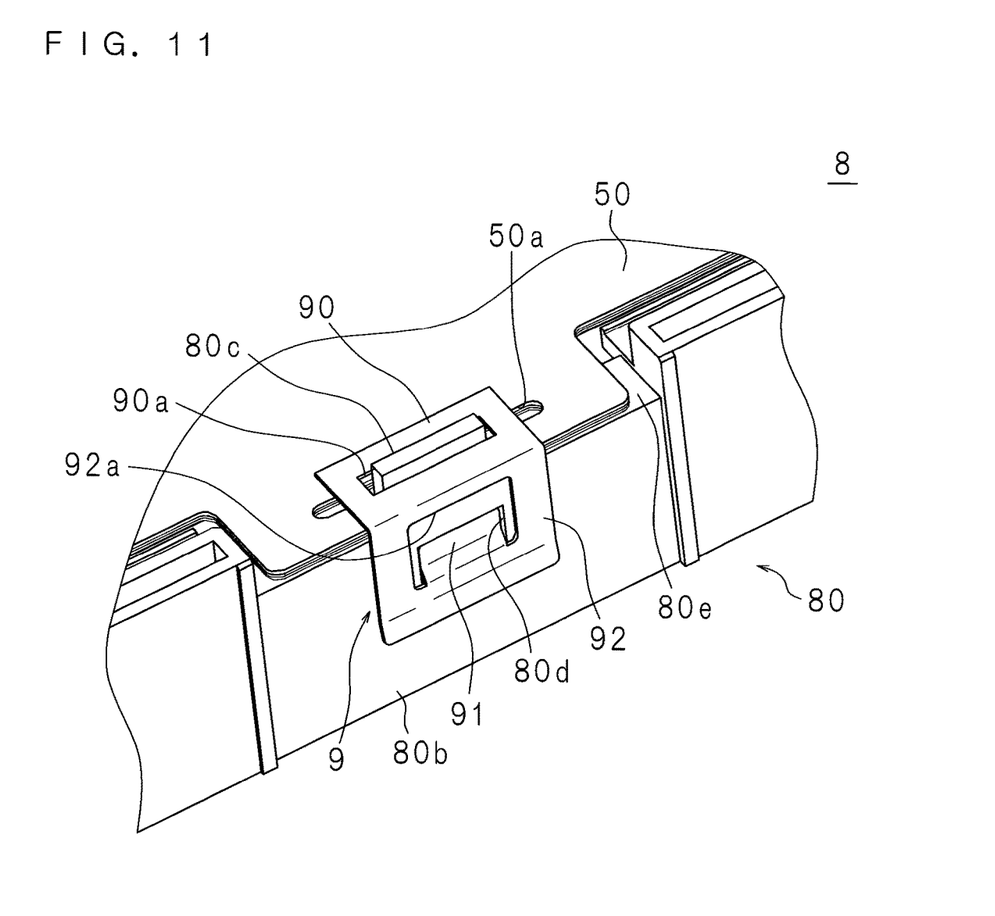
FIG. 11 is a perspective view of the backlight device to which the regulation member is attached.
Figure 12:
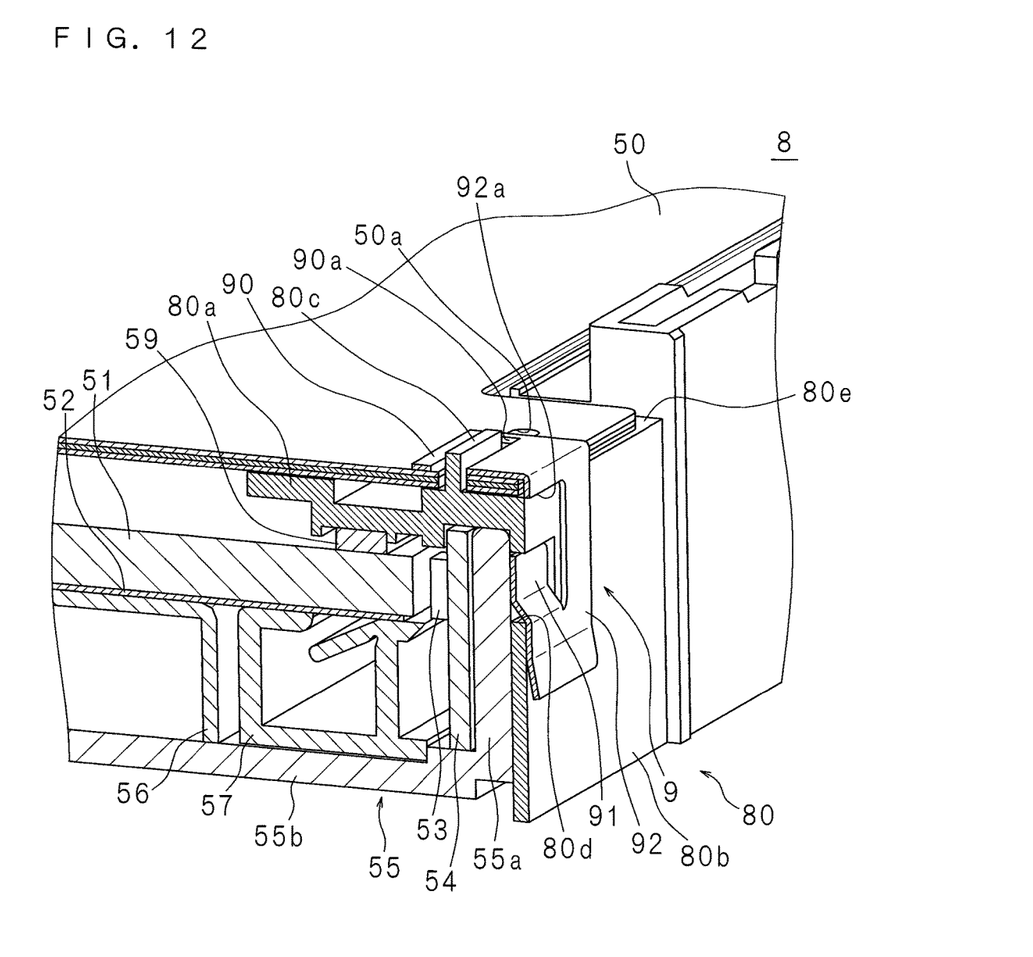
FIG. 12 is a cross-sectional perspective view illustrating a part of the backlight device.

FIG. 11 is a perspective view of the backlight device 8 to which the regulation member 9 is attached, and FIG. 12 is a cross-sectional perspective view illustrating a part of the backlight device 8. As illustrated in FIGS. 11 and 12, the protrusion part 80c of the cover body 80 inserted into the through hole 50a of the optical sheet is inserted into the opening 90a, the annular part 90 is engaged with the protrusion part 80c, and the rectangular plate-shaped insertion part 91 is inserted into the hole 80d provided in the second cover part 80b of the cover body 80. Therefore, the regulation member 9 is engaged with each of the optical sheet 50 and the cover body 80. In this case, the lower surface of the insertion part 91 faces the upper wall part 55a of the heat dissipater 55.

The insertion part 91 of the regulation member 9 is inserted into the hole 80d provided in the second cover part 80b of the cover body 80 so that the regulation member 9 is prevented from moving in the front-rear and left-right directions, that is, in the plane direction of the second cover part 80b with respect to the cover body 80.

The vertical and horizontal dimensions of the through hole 50a of the optical sheet 50 is slightly larger than the vertical and horizontal dimensions of the a tip face of the protrusion part 80c in the cover body 80. Thereby, it is possible to allow the optical sheet 50 to be thermally expanded.

Further, the regulation member 9 is engaged with each of the optical sheet 50 and the cover body 80 so that the optical sheet 50 is not largely moved in the upper-lower and left-right directions with respect to the cover body 80. A portion of the upper circumferential part of the optical sheet 50 is held by the annular part 90 of the regulation member 9 and the first cover part 80a of the cover body 80. Therefore, the movement of the optical sheet 50 in the upper-lower and left-right directions is suppressed, and the movement of the optical sheet 50 in the plane direction is regulated. In addition, a upper-lower direction movement of the optical sheet 50 of a difference or more between the distance of the protrusion part 80c in the upper-lower direction and the distance of the through hole 50a of the optical sheet 50 in the upper-lower direction does not occur. The left-right direction movement of the optical sheet 50 of a difference or more between the distance of the protrusion part 80c in the left-right direction and the distance of the through hole 50a in the left-right direction.

When the optical sheet 50 moves downward, the upper side of the through hole 50a of the optical sheet 50 contacts the protrusion part 80c of the cover body 80, and then the optical sheet 50 is not further moved downward. In addition, when the optical sheet 50 moves upward, the lower side of the through hole 50a of the optical sheet 50 contacts the protrusion part 80c, and then the optical sheet 50 is not further moved upward.

When the optical sheet 50 moves in the left-right direction, the left or right side of the through hole 50a of the optical sheet 50 contacts the left or right side of the protrusion part 80c, and then the optical sheet 50 is not further moved leftward or rightward.

As described above, the regulation member 9 is engaged with each of the optical sheet 50 and the cover body 80 to regulate the movement of the optical sheet 50 in the plane direction. Therefore, it is possible to prevent the optical sheet 50 from largely moving due to the vibration of the display apparatus 7, impact applied to the display apparatus 7 or the like. Accordingly, the large movement of the optical sheet 50 does not occur. Therefore, the display panel 10 is not scratched and a deterioration in a quality of the image displayed on the display panel 10 is prevented. Further, the regulation member 9 is engaged with each of the optical sheet 50 and the cover body 80 so that it is possible to regulate the movement of the optical sheet 50 in the plane direction without using a screw, and the backlight device 8 is inexpensive. Moreover, there is no need to provide a space for screwing the screw so that the backlight device 8 is compact. In addition, the display apparatus 7 including the compact and inexpensive backlight device 8 is also compact and inexpensive.

It is noted that, in Embodiment 2, the shape of the opening 90a provided in the annular part 90 of the regulation member 9 is not limited to the rectangular shape, but may be any shape as long as the protrusion part 80c of the cover body 80 can be inserted thereinto. Similarly, the shape of the protrusion part 80c is not limited to the rectangular plate shape, but may be any shape as long as it can be inserted into the opening 90a. The shape of the insertion part 91 is not limited to the rectangular plate shape, but may be any shape as long as it can be inserted into the hole 80d provided in the second cover part 80b of the cover body 80. The shape of the hole 80d provided in the second cover part 80b of the cover body 80 is not limited to the rectangular shape, but it may be any shape as long as the insertion part 91 can be inserted thereinto. In addition, the regulation member 9 may be any shape as long as it connects the annular part 90 with the insertion part 91, and the connecting part 92 may not be the shape in which the opening 92a is provided therein.

In addition, in Embodiments 1 and 2, the light source that emits light to the upper end face of the light guide plate 51 is not limited to the LED 53, but it may be, for example, the cold-cathode tube.

The invention claimed is:

1. A backlight device, comprising:
   a light source;
   a light guide plate with an end face which light from the light source enters and with one plane from which the light is emitted;
   an optical sheet that faces the one plane;
   a cover body that is disposed between the one plane of the light guide plate and the optical sheet, and covers the light source and a circumferential part of the one plane on the light source side; and a regulation member that is engaged with each of the optical sheet and the cover body to regulate a movement of the optical sheet in a plane direction, wherein the optical sheet includes a through hole, wherein the cover body includes:

a first cover part that covers the circumferential part of the one plane;

a second cover part that covers the end face of the light guide plate;

a first hole which is provided in the first cover part and communicates with the through hole; and a second hole provided in the second cover part, and wherein the regulation member includes:

a first insertion part that is inserted into the through hole and the first hole;

a second insertion part that is inserted into the second hole; and a connecting part that connects the first insertion part with the second insertion part.

2. The backlight device according to claim 1, wherein the second insertion part is formed in a rectangular plate shape, and wherein a plate surface of the second insertion part is substantially perpendicular to a penetrating direction of the second hole.

3. A backlight device, comprising:

a light source;

a light guide plate with an end face which light from the light source enters and with one plane from which the light is emitted;

an optical sheet that faces the one plane;

a cover body that is disposed between the one plane of the light guide plate and the optical sheet, and covers the light source and a circumferential part of the one plane on the light source side; and a regulation member that is engaged with each of the optical sheet and the cover body to regulate a movement of the optical sheet in a plane direction, wherein the optical sheet includes a through hole, wherein the cover body includes:

a first cover part that covers the circumferential part of the one plane;

a second cover part that covers the end face of the light guide plate;

a protrusion part that protrudes from the first cover part, and is inserted into the through hole; and a hole provided in the second cover part, and wherein the regulation member includes:

an annular part that is engaged with the protrusion part inserted into the through hole;

an insertion part that is inserted into the hole; and a connecting part that connects the annular part with the insertion part.

4. The backlight device according to claim 3, wherein the insertion part is formed in a rectangular plate shape, and wherein a plate surface of the insertion part is substantially perpendicular to a penetrating direction of the hole.

5. A display apparatus comprising:

a display panel that displays an image; and the backlight device according to claim 1, that irradiates the display panel with light.

6. A display apparatus comprising:

a display panel that displays an image; and the backlight device according to claim 5, that irradiates the display panel with light.

* * * * *